(No Model.)
D. HERSHBERGER.
AUTOMATIC GATE.
No. 281,692. Patented July 24, 1883.
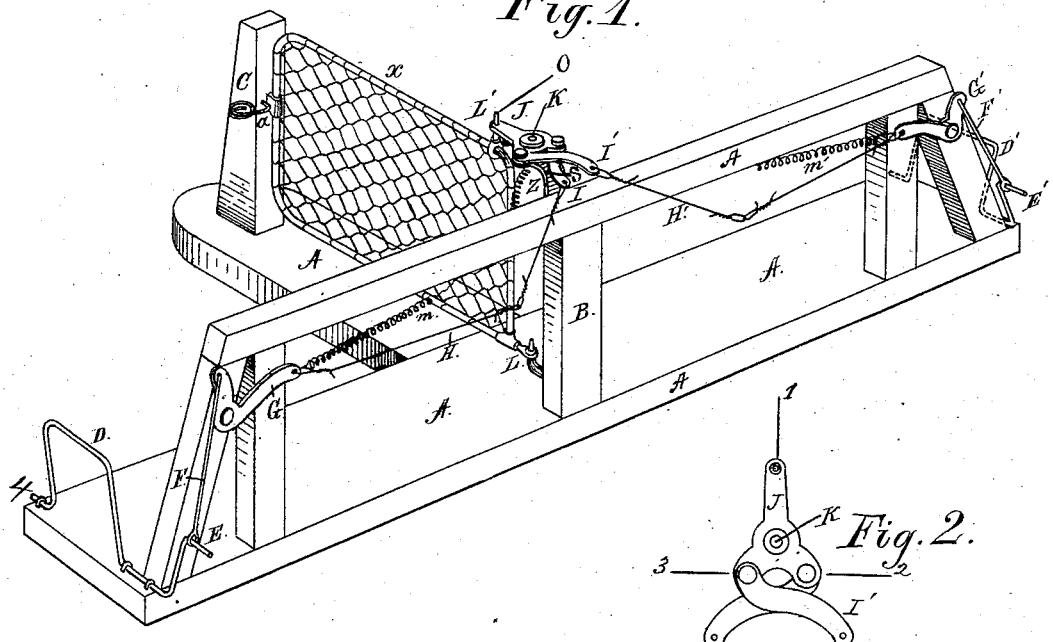
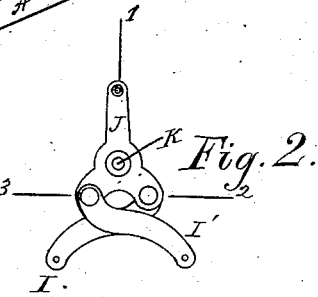
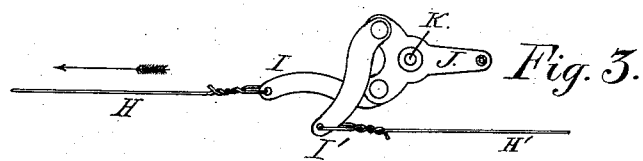
Witnesses
John P. Deal
J. B. ———
Inventor:
Daniel Hershberger
by W. J. Dennis
Attorney

UNITED STATES PATENT OFFICE.

DANIEL HERSHBERGER, OF MILLVILLE, INDIANA, ASSIGNOR OF ONE-HALF TO JOHN BRUNNER, OF SAME PLACE.

AUTOMATIC GATE.

SPECIFICATION forming part of Letters Patent No. 281,692, dated July 24, 1883.

Application filed January 20, 1883. (No model.)

*To all whom it may concern:*

Be it known that I, DANIEL HERSHBERGER, a citizen of the United States, residing at Millville, in the county of Henry and State of Indiana, have invented certain new and useful Improvements in Automatic Gates, of which the following is a specification, reference being had therein to the accompanying drawings.

My invention relates to that class of gates called "automatic," the devices for operating which are actuated by the wheels of a carriage or other vehicle passing the same.

My invention consists in the employment of a compound hinge attached to the top of the post and connected with the rear upper corner of the gate, by which a rotary motion is given to that part of the hinge attached to the gate, and by which the gate is raised at its front end before the inclination is given it to swing open or shut.

In the drawings which accompany this specification, forming a part thereof, Figure 1 is a perspective view of my improved gate and the devices by which it is operated. Fig. 2 is a top view of the compound hinge, showing the position of its parts when the gate is closed. Fig. 3 is a view of the same, showing the position of its parts when the gate is open.

In Fig. 1, A A A A represent the framing which supports the operating devices, and B is the hinge-post, to which the gate is suspended. S represents a knee the perpendicular portion of which is secured to the top of the hinge-post B, its horizontal part extending at right angles in the direction of the catch-post C. This horizontal portion of the knee S serves as a rest or support for a triangular plate, J, to which said plate is pivoted by a bolt extending through both, as shown at K, Fig. 1.

J is a triangular plate pivoted to the horizontal rest of the knee S at its center, and at the corners or projections provided with holes, as seen at 1 2 3, Fig. 2. The plate J has a lateral motion on its center, imparted to it by the curved arms I I' and their connections. A round post or pivot, O, is attached vertically to the upper rear end of the gate $x$, upon which is placed the front end of the plate J, the pivot O being inserted in the hole 1, Fig. 2, as shown at L', Fig. 1.

D is a crank whose axis is secured to the framing, as seen at 4, Fig. 1, and is provided with an arm, E, the arm E being at an acute angle with the side bar of the crank D. A connecting-rod, F, connects the arm E with the short arm of the rocker G, which is hinged or pivoted to the framing A at its lower end, and its upper portion is divided into two arms of unequal length, receding from each other, and furnished with holes at the outer ends. The hole in the short arm receives the upper end of the rod F, while that of the long arm receives the connecting-rod H. The rods H H' are conveniently jointed and connect the rockers G G' with the curved arms I I', which are pivoted to the rear corners of the plate J, as shown at 2 and 3, Fig. 2. A spring, $m$, is attached to the framing A, near the post B, and extends to and is connected with the long arm of the rocker G, and, acting through the rod F and arm E, it restores the crank D to its original upright position after being pressed down by the carriage-wheel.

When the gate $x$ is at rest and held closed by the catch upon the catch-post C, the first effect of the pressure on the crank D, communicated by the connection already described to the pivot O, is to raise the front end of the gate, at the same time inclining it in a direction opposite to the point where the power is applied, releasing it from the catch and swinging it fully open, when it is held by a spring-catch or other suitable device until operated for a return motion. The acute angle which constitutes the difference in the inclination of the sides of the crank D and its arm E gives a greater perpendicular motion to the arm E when the crank D is inclined toward the gate $x$ than when said crank is operated in the opposite direction. The lower hinge of the gate is of the common form and location.

The operation of my improved gate is as follows: By pressing the crank D in the direction of the gate the arm E descends, carrying with it the rod F and the short arm of the rocker G, and actuating the long arm of the rocker G, together with the connecting-rod H and the curved arm I, by which motion is given to the triangular plate J on its center, carrying the pivot O in the arc of a circle and moving the gate $x$ back against the framing A, where it is held by a spring-catch or other suitable device while the vehicle is passing through the opening. This in its passage presses down and in a direction from the gate, the crank D' (shown in dotted lines in Fig. 1) carrying the arm E', the rod F', and the short arm of the rocker G', operating the connecting-rod H' and the curved arm I' and giving the plate J a return motion and bringing the gate $x$ back to its original position to the catch-post C. The operation of the devices and the results are the same upon passing the gate from either direction.

Having thus fully described my invention, what I claim as new, and desire to secure by Letters Patent, is—

The combination of the plate J, curved arms I I', connecting-rods H H', the rockers G G', rods F F', arms E E', and cranks D D', in the manner and for the purpose herein described.

In testimony whereof, I affix my signature in presence of two witnesses.

DANIEL HERSHBERGER.

Witnesses:
JOHN F. ROBBINS,
W. I. DENNIS.